United States Patent

[11] 3,596,769

[72] Inventor Dan D. Baldwin
  Mundelein, Ill.
[21] Appl. No. 48,791
[22] Filed May 4, 1970
[45] Patented Aug. 3, 1971
[73] Assignee Thermel Incorporated
  Franklin Park, Ill.
  Continuation of application Ser. No.
  800,419, Feb. 19, 1969, now abandoned.

[54] FILTER FOR COOLANT OILS FOR CUTTING TOOLS
  10 Claims, 10 Drawing Figs.
[52] U.S. Cl. .................................................. 210/298,
  210/512, 210/526
[51] Int. Cl. .................................................. B01d 21/26
[50] Field of Search .......................................... 210/298,
  512, 526, 262, 294

[56] References Cited
  UNITED STATES PATENTS
  3,433,361 3/1969 Ades .......................... 210/298 X Primary Examiner—J. L. DeCesare
Attorney—Hill, Sherman, Meroni, Gross & Simpson ABSTRACT: Recirculating filter for coolant oils for cutting tools including a main coolant tank having a liquid-separating tank disposed within and extending across the main tank to separate the first tank into an active zone along a dirty coolant inlet into the main tank on one side of the liquid separating tank and a settling zone on the opposite side of the liquid-separating tank. The liquid-separating tank has a dirty coolant area in communication with the active zone of the main tank and a clean coolant area separated from the dirty coolant area by a partition. A cyclone discharges clean liquid from its top into the clean coolant area of the liquid-separating tank and discharges solid particles and entrained oil into a barometric leg having communication with the settling zone of the main tank. An air inlet leads onto the barometric leg behind the apex of the cyclone. The Venturi action of the liquid and solid particles discharging through the apex of the cyclone, draws air through the air inlet to balance the liquid and solids discharging from the cyclone, and prevent the solid particles and liquid from building up into the cyclone. Swarf-controlled grates cooperate with a drag conveyor in the active zone of the main tank to reduce the floating swarf and cause it to be carried away by the drag conveyor.

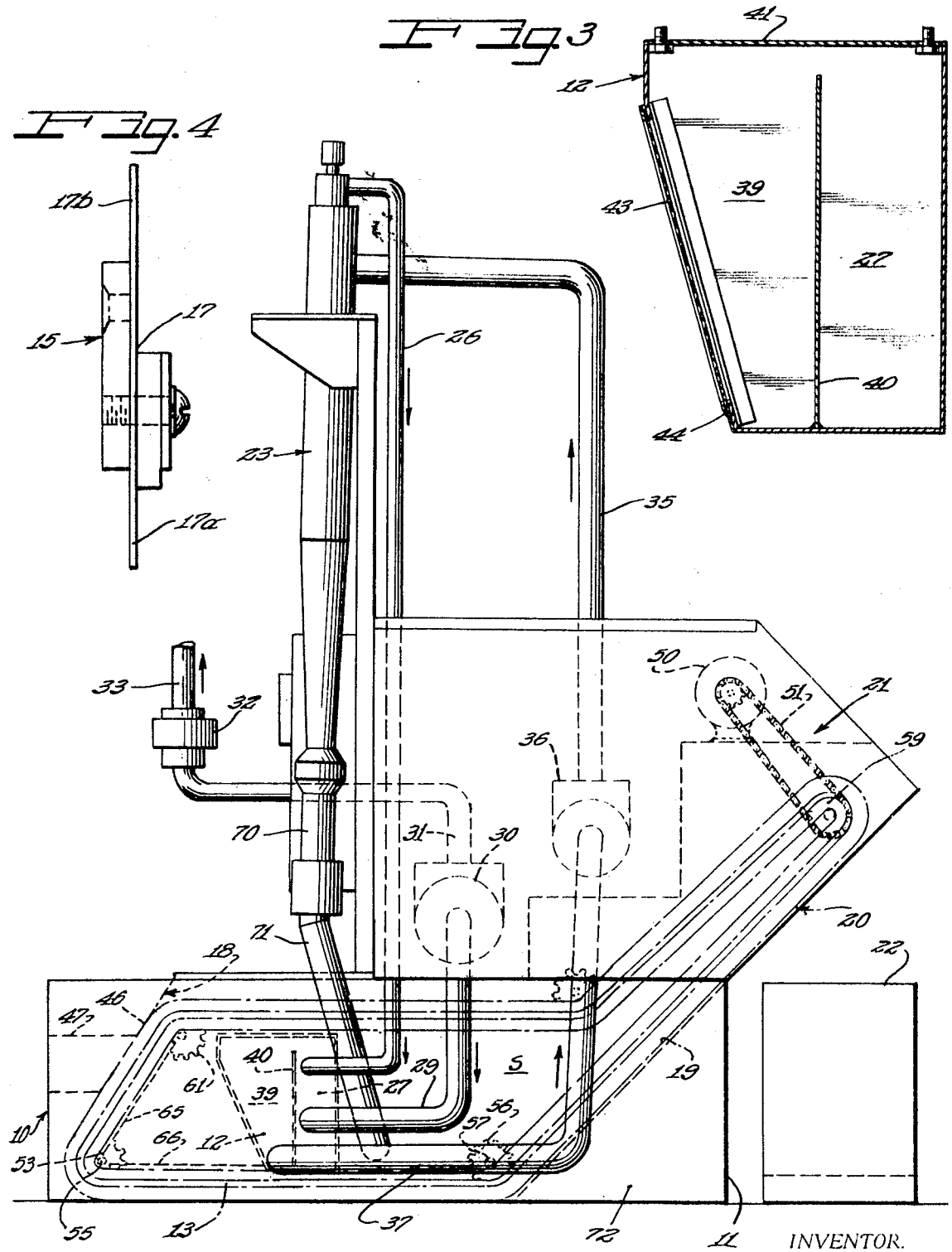

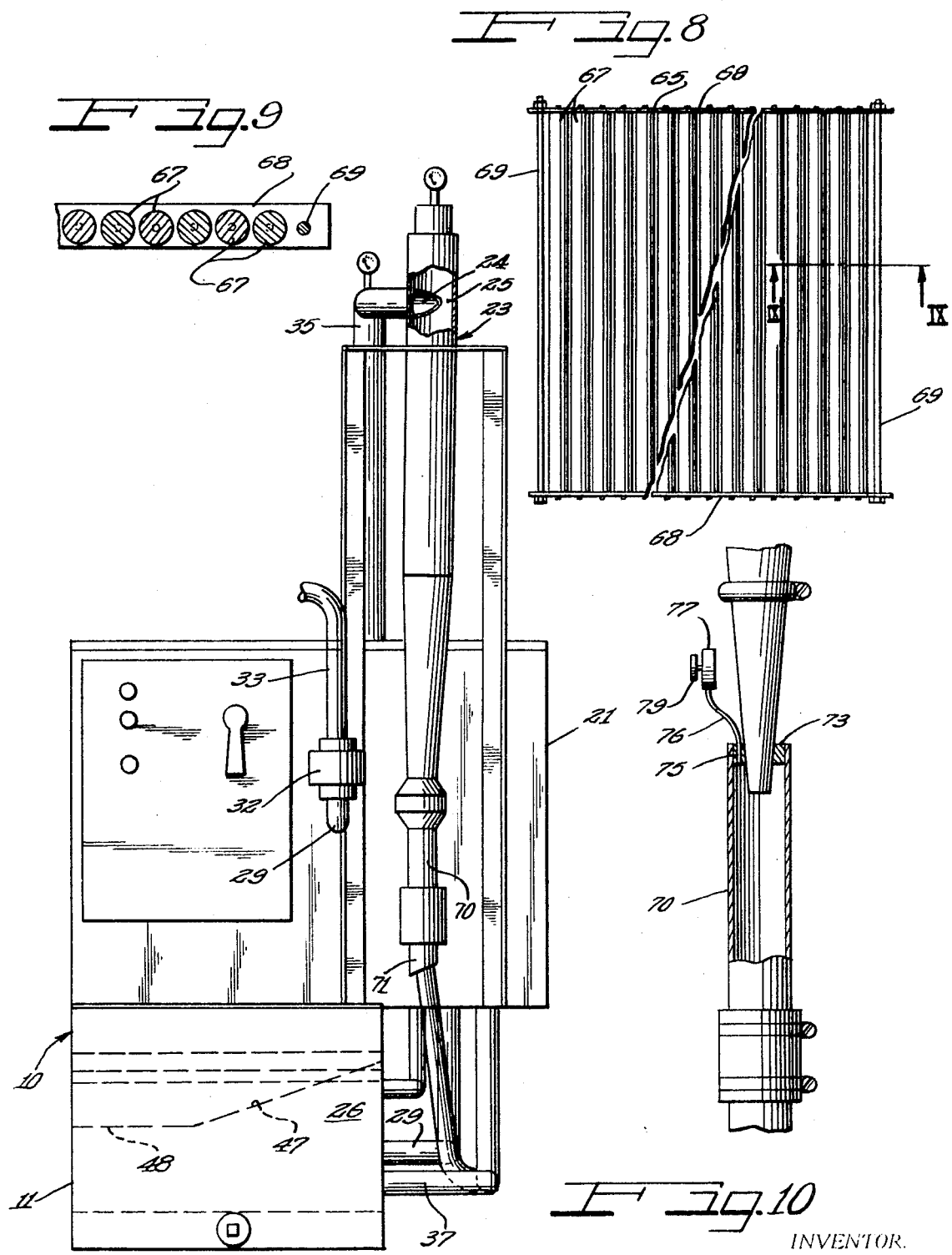

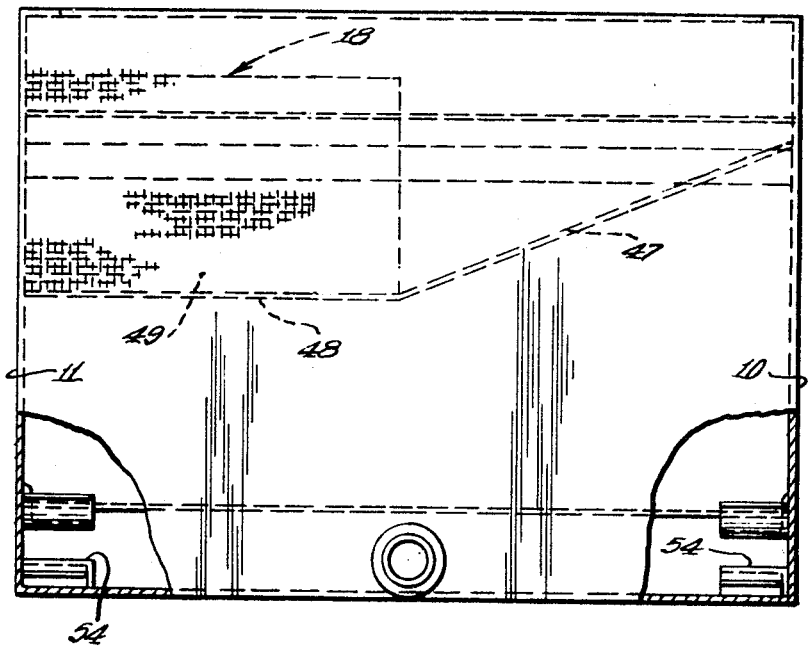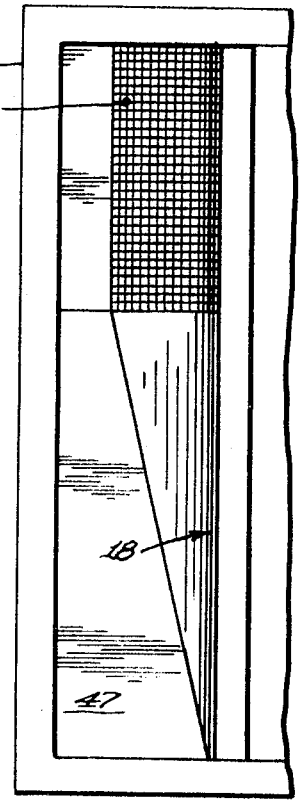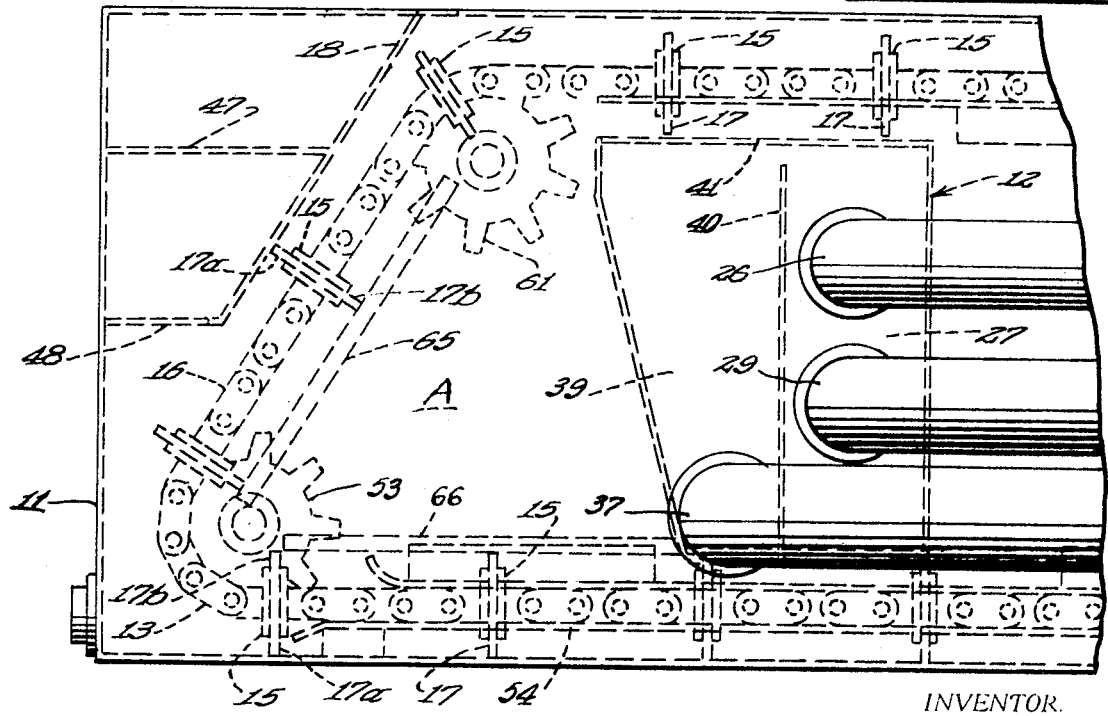

3,596,769

1

FILTER FOR COOLANT OILS FOR CUTTING TOOLS

This application is a continuation of my prior copending application Ser. No. 800,419, filed Feb. 9, 1969, and now abandoned.

SUMMARY AND OBJECTS OF THE INVENTION

Coolant oil cleaner adapted to filter the cutting oil for individual machine tools, in which dirty coolant cutting oil loaded with heavy particles enters one end of the cleaner, the heavy particles are separated from the coolant oil on the cyclone principle and the clean coolant oil is delivered for reuse while the heavy particles are carried out by a drag-out conveyor.

A principal object of the present invention is to provide an improved form of cleaner for coolant oils for cutting tools arranged with a view toward recirculating the coolant oil, and taking the dirty coolant oil and providing a continuous supply of clean coolant oil, and obviating the need for paper, cloth, filter aids or filter screens.

Another object of the invention is to provide a cleaner for coolant cutting oils, separating the solid particles from the liquid and providing a continuous supply of clean liquid as long as the filter is in operation, without the use of the conventional valves.

Still another object of the invention is to improve upon the coolant cutting oil cleaners heretofore in use and provide a simpler and more compact construction of filter by utilizing a cyclone to separate the clean oil from the solid particles and discharging the solid particles and entrained oil from the apex of the cyclone, in which air is drawn by the Venturi action of the cyclone at its apex between the discharge end of the cyclone and its barometric leg, to provide a balance between the air, oil and solid particles discharged from the cyclone, and to thereby prevent the solid particles from building up in the cyclone and coming out with the clean coolant at the top of the cyclone.

Still another object of the invention is to provide an improved form of coolant oil cleaner for cleaning the coolant cutting oils for machine tools, in which a simple and improved form of swarf control is provided in cooperation with the drag-out conveyor, to eliminate floating swarf in the cutting oil.

These and other objects of the invention will appear from time to time as the following specification proceeds and with reference to the accompanying drawings.

DESCRIPTION OF THE DRAWINGS

FIG. 1 is a view in side elevation of a coolant cutting oil cleaner constructed in accordance with the principles of the present invention.

FIG. 2 is an end view of the cleaner shown in Figure 1 looking at the cleaner from the dirty coolant oil inlet end thereof, with certain parts broken away and certain other parts shown in vertical section.

FIG. 3 is an enlarged longitudinal sectional view taken through the liquid separating tank extending across and within the first tank.

FIG. 4 is a detail vertical sectional view showing certain details of one of the drag-out conveyor flights.

FIG. 5 is an enlarged fragmentary view in side elevation, looking at the inlet end portion of the main coolant tank and showing certain details of the invention not shown in Figures 1 and 2.

FIG. 6 is a fragmentary plan view looking down on the inlet end portion of the main coolant cleaning tank.

FIG. 7 is an enlarged fragmentary end view of the main coolant tank.

FIG. 8 is a plan view of one of the swarf control grates.

FIG. 9 is a fragmentary transverse sectional view taken substantially along line IX-IX of Figure 8; and FIG. 10 is an enlarged view showing the discharge from the apex of the cyclone cleaner into the barometric leg.

DESCRIPTION OF PREFERRED EMBODIMENT OF INVENTION

In the embodiment of the invention illustrated in the drawings, I have shown in Figure 1 a coolant cleaner or filter 10 including an elongated main tank 11 having a liquid separating tank 12 therein and extending thereacross and separating the tank 11 into an active zone A and a settling zone S. The tank 11 has a drag conveyor 13 having flights 15 extending between chains 16 of the conveyor and having wiper blades 17 having scraping engagement with the bottom of the tank 11 and dragging the solid particles of metal along said tank from beneath a main inlet trough 18 at one end of said tank upwardly along an inclined plate 19 to a discharge opening 20, disposed above and beyond the opposite end of the tank 11, and formed in an angularly upward continuation of the plate 19 extending between the sidewalls of a hood 21. A tote box 22 is shown as being disposed beneath the discharge opening 20 for collecting the solid particles, such as metal chips, shavings and other solid material settling from the cooling oil to the bottom of the tank 11.

The coolant cleaner also includes a vertically extending cyclone 23. One suitable form of cyclone is the cyclone manufactured by Krebs Engineers of Palo Alto, California. The cyclone may, however, be of any suitable commercial form, separating liquids from solid particles on the cyclone principle.

The cyclone 23 has an inlet 24 for dirty coolant containing solid particles of metal, leading into and tangertially of an interior cylindrical wall 25 of said cyclone adjacent the top of said wall, and has an outlet for clean coolant leading through the top thereof and having communication with a pipe 26 leading downwardly to a clean coolant area 27 of the liquid-separating tank 12. An outlet pipe 29 leads from the clean coolant area of the liquid-separating tank 12 upwardly to a pump 30, driven from a suitable motor (not shown) and having a discharge pipe 31 leading therefrom and connected to a flow control 32.

The flow control 32 and pipe 33 control and conduct clean coolant oil for use in cooling and lubricating the tools of machines used for cutting metals. The flow control 32 may be of any suitable form, which will give a uniform preselected flow of clean coolant oil to the cutting tools. One form of flow control found to be suitable, is the flow control valve Model No.4212 manufactured by Griswold Controls of Costa Mesa, California.

Dirty coolant enters the cyclone inlet 24 tangentially of the wall 25 of the cyclone, through a supply pipe 35 having direct communication with said inlet 24 and connected with the discharge side of a pump 36. A pipe 37 leads from a dirty coolant area 39 of the liquid separating tank 12 to the suction side of said pump, drawing dirty coolant from the dirty coolant area and conducting the dirty coolant to the intake of the pump 36, diagrammatically shown as being like the pump 30 and driven from a suitable motor (not shown).

The liquid-separating tank 12 extends across the tank 11 and is spaced above the bottom of said tank and the conveying run of the drag conveyor 13, and has a fluidtight partition 40 extending thereacross and dividing said tank into the clean coolant area 27 and into the dirty coolant area 39. A cover 41 extends across the top of the tank 12 to prevent the contamination of clean coolant in the clean coolant area 27 (Figure 3). An intake screen 43 forms an intake for the coolant into the dirty coolant area 39 from which the coolant is transferred to the cyclone by the pump 36. The screen 43 is provided to keep the coarser chips from entering the dirty coolant area and to allow the heavier chips to settle directly to the bottom of the tank. Said screen is shown as being inclined outwardly from the bottom to the top of said tank towards the inlet trough 18 to incline the screen to generally face the bottom and intake end of said tank 11. The screen 43 may be detachably mounted in the intake to be readily removed for cleaning, in slides 44 of a suitable construction.

Spaced from the liquid separating tank 12 and extending across the inlet end of the tank 11 is the dirty coolant inlet trough 18. Said inlet trough 18 is shown in Figures 1,2 and 5 as extending across the dirty coolant inlet end of the tank 11 and having a sloping interior wall 46 sloping from the top of the tank 11 toward the adjacent wall of said tank. The inlet trough 18 also has a sloping bottom portion 47 sloping downwardly to a bottom 48 of the tank. A screen 49 is provided in the wall 46 (see Figure 6) and forms an outlet for said inlet trough 18. The screen 49 has a sufficiently wide mesh to allow solid particles to pass therethrough but to prevent large pieces of metal from passing into the active zone A of the tank 11.

The drag conveyor 13 is a chain and flight conveyor of the endless type including the laterally spaced chains 16 and the flights 15 connected therebetween. As shown in Figure 1 of the drawings, the drag conveyor 13 is driven from a motor 50 through a chain and sprocket drive 51. The chains 16 of the conveyor turn about sprockets 53 on a transverse shaft 55 adjacent the inlet end of the tank 11 and forwardly along the bottom of said tank along guides 54 extending along opposite sides of said tank and under sprockets 56 on idler shafts 57 adjacent the inner end of the inclined plate 19. From thence the chains 16 are suitably guided to travel in parallel spaced relation with respect to the plate 19 to and about drive sprockets 59 of the chain and sprocket drive 51. The return runs of the chains 16 extend under idler sprockets 60 and along the top portion of the tank 11 to and about idler sprockets 61 adjacent the intake trough 18. From thence the chains extend angularly downwardly toward the intake end wall of the tank 11 to and about the idler sprockets 53.

In filtering systems for filtering coolant cutting oils, particularly where the coolant oils are for cooling grinding tools, the particles from the grinding wheel form a swarf which floats in the cooling oil in the tank 11 along the top of the tank and does not readily settle. By the structure of the present invention, I have provided a floating swarf control in the active zone A of the tank 11, shown as being in the form of grates 65 and 66 respectively extending parallel to the inclined downrunning run of the drag-out conveyor 13 and parallel to the drag-out run of said conveyor to a position adjacent the liquid separating tank 12. The grates 65 and 66 are each of a similar construction so one of said grates only need be herein shown and described in detail. As shown in Figures 7 and 8, the grate 65 comprises a plurality of relatively closely spaced rods 67 welded or otherwise secured to parallel bars 68,68 at their ends and spaced relatively close together, as for example, substantially one-eighth inch apart and extending in the direction of travel of the conveyor. The rods 69 are shown as connecting the bars 68 together.

The flights 15 extend between the chains 16,16 and support the wiper blades 17 to a position a lower blade portion 17a to scrape along the wall 46 of the trough 18 and along the bottom of the tank 11 and upwardly along the inclined plate 19 to the outlet 20. The wiper blades 17 also extend from the flights 15 in an opposite direction and have blade portions designated by reference character 17b. The portions 17b of the flights 15 wipe downwardly along the rods 67 and drag the swarf collected thereon toward the bottom of the tank 11. The portions 17b of said wiper blades also wipe along the bottoms of the rods of the grate 66 and progress any swarf that may be collected thereon into the settling zone S of the tank 11 where the swarf may settle and be progressed along the inclined plate 19 through the drag-out outlet 20 in said plate. The grates 65 and 66 wiped by the wiper blades 17b in the plates 19 are thus maintained clean by said wiper blades and any swarf collecting thereon is moved downwardly toward the bottom of the tank with the result that little, if any, swarf floats in the tank, and substantially all of the swarf is progressed and discharged through the outlet 20. If desired, a conventional cleaner (not shown) may be provided for the blades 17a and 17b as they pass along the outlet 20, to wipe solid particles and swarf which may adhere to the flights as they pass by said outlet.

The structure just described provides a relatively small active zone from which the dirty coolant is taken into the dirty coolant area 39 of the settling tank 12 and pumped to the intake port 24 of the cyclone through the pipes 37 and 35. This active zone in addition to the grates 65 and 66 therein and the flights wiping along said grates and progressing the material toward the bottom of the tank effectively progresses the swarf toward the bottom of the tank, as well as solids, such as chips and the like discharged into the tank through the screen 49.

The tank 11 also has a relatively large quiescent settling zone into which chips and oil adhering thereto are discharged through a barometric leg 70 and pipe 71 leading downwardly therefrom and opening through a sidewall 72 of the tank 11, in the settling zone S thereof, and adjacent the bottom thereof, to discharge the chips and dirty oil into said settling zone to readily settle to the bottom of the tank.

The construction just described besides eliminating floating swarf in the tank also improves the efficiency of the cleaner and enables the solid particles to readily settle to the bottom of the tank in the settling zone S and be efficiently dragged along the bottom of the tank by the drag conveyor 13 and discharged through the outlet 20 into the tote box 22.

Referring now in particular to Figures 1,3 and 10 and certain novel features of the cyclone cleaner and the discharge therefrom directly into the settling zone of the tank 11, the apex of the cyclone 23 extends into the barometric leg 70 to discharge the solid particles and oil adhering thereto directly into said barometric leg to be returned to the settling zone S of the tank. As shown in Figure 10, the apex of the cyclone extends through and is mounted in a block 73, mounted in the top of the barometric leg 70. A passageway 75 leads into and through the block 73 and terminates behind the apex of the cyclone. Air may thus be drawn into the barometric leg by the Venturi effect of liquid discharged from the apex of the cyclone to balance the oil and solid particles discharged from the cyclone and to thereby prevent the oil and solid particles from building up in the cyclone and passing out the clean coolant outlet into the clean coolant line 26.

As shown in Figure 10, the passageway 75 is in the form of a pipe 76 of suitable cross section having a valve 77 on the end thereof, manually operable by turning of a knob 79, to regulate the flow of air into the barometric leg 70. The passageway 75, while shown as being in the form of a pipe, need not be a pipe, but may be a slot in the block 73 of the cross-sectional area required to maintain a balance of liquid and air in the barometric leg 70 and to therefore make it possible to have a relatively short barometric leg discharging directly into the settling zone of the tank 11.

A simple and improved coolant oil cleaner for dirty cutting oil has thus been provided in which a continuous circulation of cutting oil may be attained, with the dirty cutting oil entering the tank from one side and drawn to a cyclone where it is cleaned, and the clean cutting oil is pumped from a second tank within the first tank for use under the control of a flow control, and a simple system has been provided for preventing the material coming off the grinding wheel where the coolant oil is used for cooling grinding operations, from floating in the oil in the tank in the form of swarf, and that the cleaner requires no valves or magnets and merely requires separate pumps for the dirty and clean coolant oil and an individual motor driving the drag conveyor dragging the solid particles and swarf settling to the bottom of the main tank for discharge into the tote box 22.

While I have herein shown and described one form in which the invention may be embodied, it may readily be understood that various variations and modifications in the invention may be attained without departing from the spirit and scope of the novel concepts thereof.

I claim as my invention:

1. In a filter for coolant oils for cutting tools and the like, in combination, coolant tank having an active zone and a settling zone, a dirty coolant inlet leading into said active zone, particle-separating means supplied with dirty coolant solutions from said active zone and mixing the dirty coolant inlet solutions of different specific gravities and stripping off the solid particles for return to said settling zone and comprising a cyclone having an inlet for dirty coolant solutions adjacent the top thereof leading thereinto tangentially of the wall thereof, said cyclone having a frustoconical interior wall disposed beneath said inlet and converging to a downwardly opening apex, a clean coolant outlet leading from the top of said cyclone, a separated particle outlet leading from the apex of said cyclone, a barometric leg having communication with said apex and conducting the solid particles and oil entrained therein to said settling zone of said tank, and an air inlet leading into said barometric leg adjacent the apex of said cyclone, whereby the Venturi effect of entrained oil and solid particles passing through said apex draws air into said barometric leg and maintains the required balance of liquid and air to accommodate the free discharge of solid particles and entrained oil into said settling zone of said tank.

2. A coolant oil cleaner in accordance with claim 1, including means in communication with said air inlet means selectively operable to regulate the flow of air drawn into said barometric leg by the Venturi action of oil and solid particles passing through the apex of said cyclone.

3. The coolant oil cleaner in accordance with claim 2, wherein the means in communication with the air inlet for regulating the flow of air drawn into said barometric leg comprises a manually operable valve.

4. A coolant oil cleaner in accordance with claim 1, including
a closure means for the upper end of said barometric leg and forming a support for the apex of said cyclone, and having the air passageway leading therethrough, and
a valve regulating the flow of air through said closure means.

5. A filter for coolant oils in accordance with claim 1, including,
a liquid-separating tank in said coolant tank having,
a dirty coolant area in communication with said active zone and having,
a clean coolant area separated from said dirty coolant area,
an outlet from said dirty coolant area to said inlet of said cyclone,
an inlet into said clean coolant area connected with said clean coolant outlet leading from the top of said cyclone, and
an outlet from said clean coolant area to use.

6. A filter for coolant oils in accordance with claim 5, including, a manually operable valve for regulating the flow of air drawn into said barometric leg by the Venturi action of oil and solid particles passing through the apex of said cyclone.

7. In a filter for coolant oils for cutting tools and the like, in combination,
a coolant tank having an active zone and a settling zone spaced along said tank from said active zone,
a dirty coolant inlet trough at one end of said tank in said active zone and having a screened discharge opening facing towards said active and settling zones,
a drag conveyor removing settled solids from the bottom of said coolant tank and having a conveying run having scraper flights movable along said tank in scraping engagement with the bottom of said tank along said active and settling zones for dragging the settled solids from said tank, and having a return run movable along the top of said tank and downwardly therefrom along said screened discharge opening of said dirty coolant inlet into the active zone of said tank,
swarf separating means facing said screened discharge opening of said dirty coolant inlet trough and on the opposite side of said return run of said drag conveyor from said discharge opening for separating floating particle swarf from the grinding wheels, from the coolant in said active zone, said swarf separating means including, a grate extending downwardly along said tank and facing said discharge opening from said dirty coolant inlet trough and extending along the inner side of the run of said conveyor movable along said discharge opening, in position to be wiped by the flights of said conveyor passing along said grate downwardly from the top to the bottom thereof and to progress the swarf tending to float in the coolant oil to the bottom of said tank.

8. A filter in accordance with claim 7,
wherein the grate comprises a series of closely spaced parallel rods facing said dirty coolant inlet and extending along the downwardly moving portion of the return run of said conveyor and oriented in the direction of travel of said conveyor, and
wherein said flights have wiper blades extending therealong having wiping engagement with said rods when traveling downwardly therealong to progress the swarf along said rods to the bottom of said tank.

9. The coolant oil cleaner of claim 8, wherein the wiper blades are flexible and extend in opposite directions from said chain and flights, wiping the bottom of said tank along the flexible end portions of said wiper blades extending in one direction from said flights and wiping said screened inlet rods when traveling downwardly therealong along the same end portions of said flights and wiping said rods along the opposite flexible end portions of said flights.

10. A filter for coolant oils in accordance with claim 9, wherein the swarf separating means also includes a series of closely spaced rods extending across said tank along the active zone thereof, above and extending parallel to and in the direction of the plane of travel of the conveying run of said conveyor, dragging solid particles along the bottom of said tank, and wiped by the same flexible end portions of said flights wiping said downwardly extending rods, during travel of said drag conveyor along the active zone of said tank.